(12) United States Patent
Moroni et al.

(10) Patent No.: US 8,074,522 B2
(45) Date of Patent: Dec. 13, 2011

(54) TRANSMITTER FOR CONTROLLING INDUSTRIAL PROCESSES

(75) Inventors: Andrea Moroni, Gorla Minore (IT); Roberto Parravicini, Lenno (IT)

(73) Assignee: ABB S.p.A., Milan (IT)

(*) Notice: Subject to any disclaimer, the term of this patent is extended or adjusted under 35 U.S.C. 154(b) by 677 days.

(21) Appl. No.: 12/162,637

(22) PCT Filed: Jan. 10, 2007

(86) PCT No.: PCT/EP2007/050229
§ 371 (c)(1),
(2), (4) Date: Jul. 30, 2008

(87) PCT Pub. No.: WO2007/085530
PCT Pub. Date: Aug. 2, 2007

(65) Prior Publication Data
US 2010/0058858 A1   Mar. 11, 2010

(30) Foreign Application Priority Data
Jan. 30, 2006   (IT) .............................. MI2006A0152

(51) Int. Cl.
*G01L 7/00* (2006.01)

(52) U.S. Cl. ........................................................ 73/756

(58) Field of Classification Search .................. None
See application file for complete search history.

(56) References Cited

U.S. PATENT DOCUMENTS

| | | | |
|---|---|---|---|
| 5,668,322 A | 9/1997 | Broden | |
| 6,772,641 B2 | 8/2004 | Massimo et al. | |
| 6,901,803 B2 | 6/2005 | Fandrey | |
| 7,472,608 B2* | 1/2009 | Hedtke | 73/861.63 |
| 2004/0154404 A1* | 8/2004 | Parravicini | 73/756 |
| 2005/0034523 A1* | 2/2005 | Casimiro et al. | 73/715 |
| 2006/0162458 A1* | 7/2006 | Broden | 73/708 |
| 2007/0107525 A1* | 5/2007 | Schnaare et al. | 73/756 |
| 2009/0078054 A1* | 3/2009 | Romo | 73/717 |
| 2009/0308170 A1* | 12/2009 | Broden | 73/723 |
| 2010/0148982 A1* | 6/2010 | Hedtke | 340/686.6 |
| 2010/0307254 A1* | 12/2010 | Klosinski et al. | 73/756 |
| 2011/0057811 A1* | 3/2011 | Hedtke | 340/870.02 |

FOREIGN PATENT DOCUMENTS

WO    WO-9508759 A1    3/1995

\* cited by examiner

*Primary Examiner* — Andre Allen
(74) *Attorney, Agent, or Firm* — Connolly Bove Lodge & Hutz LLP

(57) ABSTRACT

Transmitter for sensing a physical variable relative to a process fluid of an industrial plant, characterized in that it comprises at least a hollow main body for housing a sensor, and a body for direct or indirect interface with a process fluid of which a physical variable requires to be sensed, said interface body being connected to the main body and having an integral structure shaped so that it has at least one internal housing for receiving a separator body and at least one end flange suitable to be operatively coupled, at an external surface thereof, to a fluid container, said external surface being positioned at a distance from and in communication with said internal housing by means of a connection channel.

20 Claims, 4 Drawing Sheets

TRANSMITTER FOR CONTROLLING INDUSTRIAL PROCESSES

This application is a national phase of PCT/EP2007/050229, filed on Jan. 10, 2007, which claims priority to MI 2006 A 000152, filed Jan. 30, 2006, the entire contents of all are incorporated by reference.

The present invention relates to a transmitter of the type used to control physical variables in industrial processes, with improved structure and characteristics; more specifically, the present invention relates to a transmitter with integrated process interface.

As known, in industrial process control systems, in order to sense/measure one or more physical variables of a process fluid, i.e. absolute, relative or differential pressure, flow, level and the like, specific transmitters that generally use a pressure sensor are widely utilized; in fact, this makes it possible to obtain easily from one or more relative, differential or absolute pressure measurements, measurement values relative also to other physical variables of the controlled process fluid which would be more difficult to directly transduce.

According to a common embodiment, a pressure transmitter of known type currently comprises a main body, or transducer body, suitably shaped to house the components that carry out transduction; in particular, this main body includes a measurement chamber housing a pressure sensor and suitable primary electronic circuits for processing the signals arriving from the pressure sensor. Generally, a transmitter body is assembled above the main body; this is divided into two compartments separately housing further components, such as displays for in situ viewing of the variables sensed, secondary electronic circuits for processing the signals arriving from the primary electronic circuits and which then handle communication with other transmitters or with remote control units, etc.

To perform the sensing and measurement operations required, the pressure transmitter is completed with a further part which must be placed in contact with the process fluid; for this purpose, a common transmitter comprises one or more flanges which are coupled mechanically with the manifold pipes through which the process fluid comes into contact with the transducer. Each flange is also connected, by means of a system of screws/bolts and seals, to the main body of the pressure transmitter so that the pressure contained therein is not released and the relative seals do not leak; in proximity to the coupling surfaces suitable diaphragms or separator units comprising a specific flexible separation membrane are provided; this membrane is positioned so as to have an external wall exposed to the process fluid and an internal wall coupled hydraulically to the pressure sensor.

At the current state of the art, although adequately performing the functions required thereof, pressure transmitters of known type have some drawbacks.

In particular, a noteworthy drawback lies in the current structural structure which, as previously described, is relatively complicated from a mechanical viewpoint due to the number of components of which it is formed; this not only influences production and storage times and costs, but also those for assembly and installation at the operating site due to the relatively high number of operations required to assemble the transmitter.

A further decidedly important drawback regards the mechanical connection of each flange to the main body of the transmitter; in fact, practice has shown that if this operation, especially with regard to clamping of the screws and bolts, is not performed with great uniformity and accuracy, mechanical stresses can occur at the separation membranes, commonly known as "interference effects". Even if these connections are performed in an ideally perfect manner, mechanical stresses can still occur during the working life of the transmitter due to the influence of changing ambient conditions, and in particular of variations in temperatures and pressures, to which the connection system is unavoidably subjected.

The intensity of these mechanical stresses is generally difficult to foresee during design and normally determines imprecisions and measurement errors by the pressure transmitter, as variations in pressure can occur between the separation membrane and the pressure sensor. Often, the extent of these measurement errors is not at all negligible, due to the high performance generally required of a transmitter, especially as regards accuracy and stability in the long term. Therefore, to contain these measurement errors, as mentioned, operations to assemble the transmitter are relatively complicated and laborious. Moreover, when these measurement errors occur in a transmitter that has already been installed, it is often necessary to resort to special maintenance operations, which are particularly costly; for example, it may be necessary to replace seals which are subject to leaks and sagging caused by aging.

The main object of the present invention is to produce a transmitter for sensing a physical variable relative to a process fluid of an industrial plant that allows the previously mentioned drawbacks to be overcome, and in particular that has a simplified structural structure with respect to known transmitters.

Within this task, an object of the present invention is to produce a transmitter for sensing a physical variable relative to a process fluid of an industrial plant that allows a significant reduction in imprecisions and measurement errors, in particular relative to interference effects of the elastic separation membranes.

The main object of the present invention is to produce a transmitter for sensing a physical variable relative to a process fluid of an industrial plant that requires a small number of operations for assembly and installation thereof.

Yet another object of the present invention is to produce a transmitter for sensing a physical variable relative to a process fluid of an industrial plant that is highly reliable, relatively easy to produce and at competitive costs.

This task, and these and other objects which will be apparent from the text hereunder, are obtained by a transmitter for sensing a physical variable relative to a process fluid of an industrial plant, characterized in that it comprises at least a hollow main body for housing a sensor, and a body for direct or indirect interface with a process fluid of which a physical variable requires to be sensed, said interface body being connected to the main body and having an integral structure shaped so that it has at least one internal housing for receiving a separator body and at least one end flange suitable to be operatively coupled, at an external surface thereof, to a fluid container, said external surface being positioned at a distance from and in communication with said internal housing by means of a connection channel.

Further characteristics and advantages of the invention will be more apparent from the description of preferred, but non-exclusive, embodiments of the transmitter according to the invention, illustrated by way of a non-limiting example in the accompanying drawings, wherein.

Figure 1:
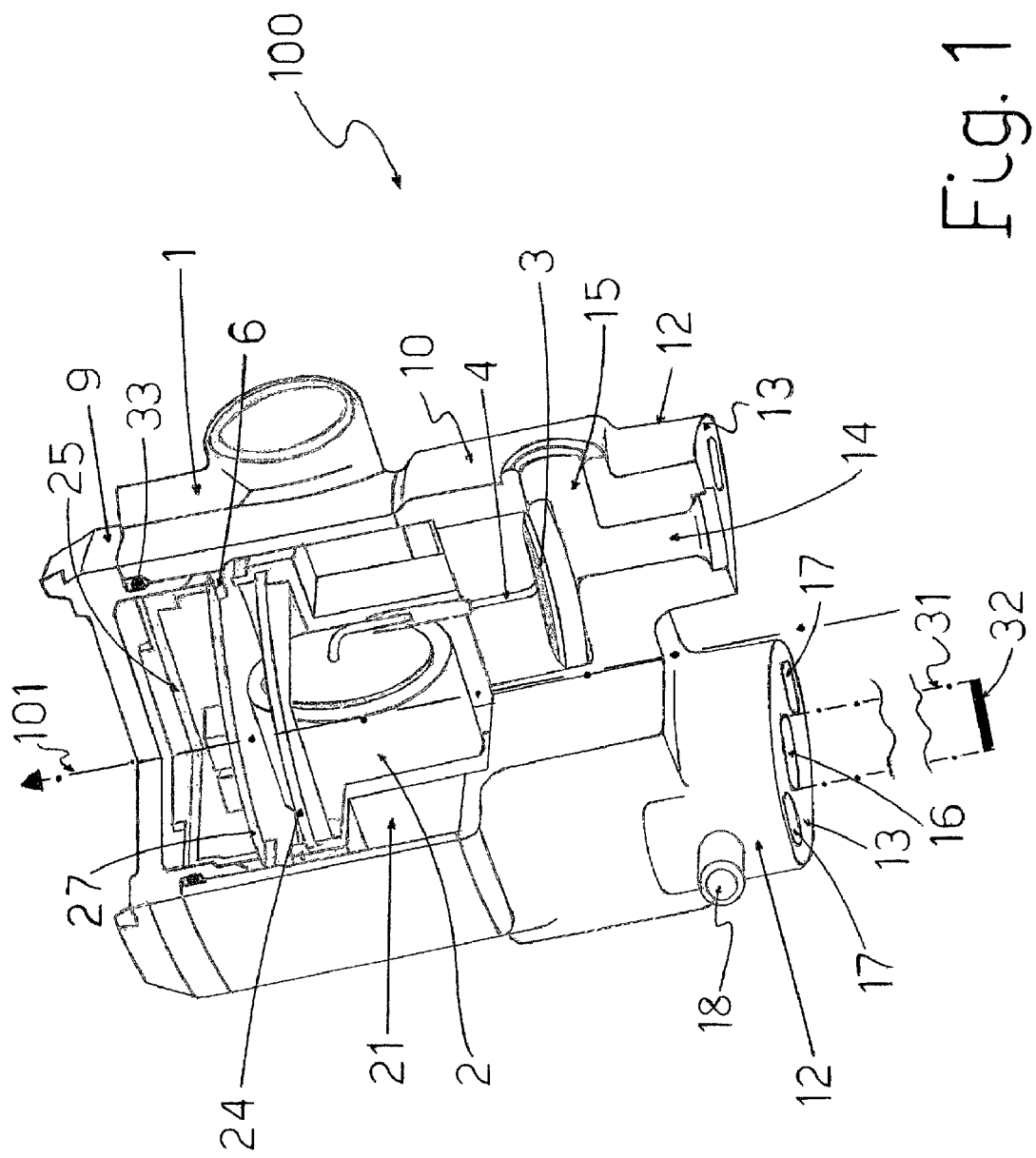
FIG. 1 is a partially sectional perspective view, illustrating the transmitter according to the invention.

With reference to the previous figures, the transmitter according to the present invention, indicated as a whole with the reference numeral 100, comprises at least a hollow main body 1 for housing a sensor 2, typically a pressure sensor, and a body 10 for direct or indirect interface with a process fluid of which a physical variable requires to be sensed; the interface body 10 is connected to the main body 1 along an inferior surface thereof, preferably by welding to form a single mechanical body, i.e. no longer separable into single components (without resorting to substantially destructive operations), extending substantially cylindrically along a longitudinal axis 101.

Advantageously, the interface body 10 is produced according to an integral structure, i.e. a piece with a single structure and therefore without connections or joins of any type between initially separate pieces.

Figure 2:
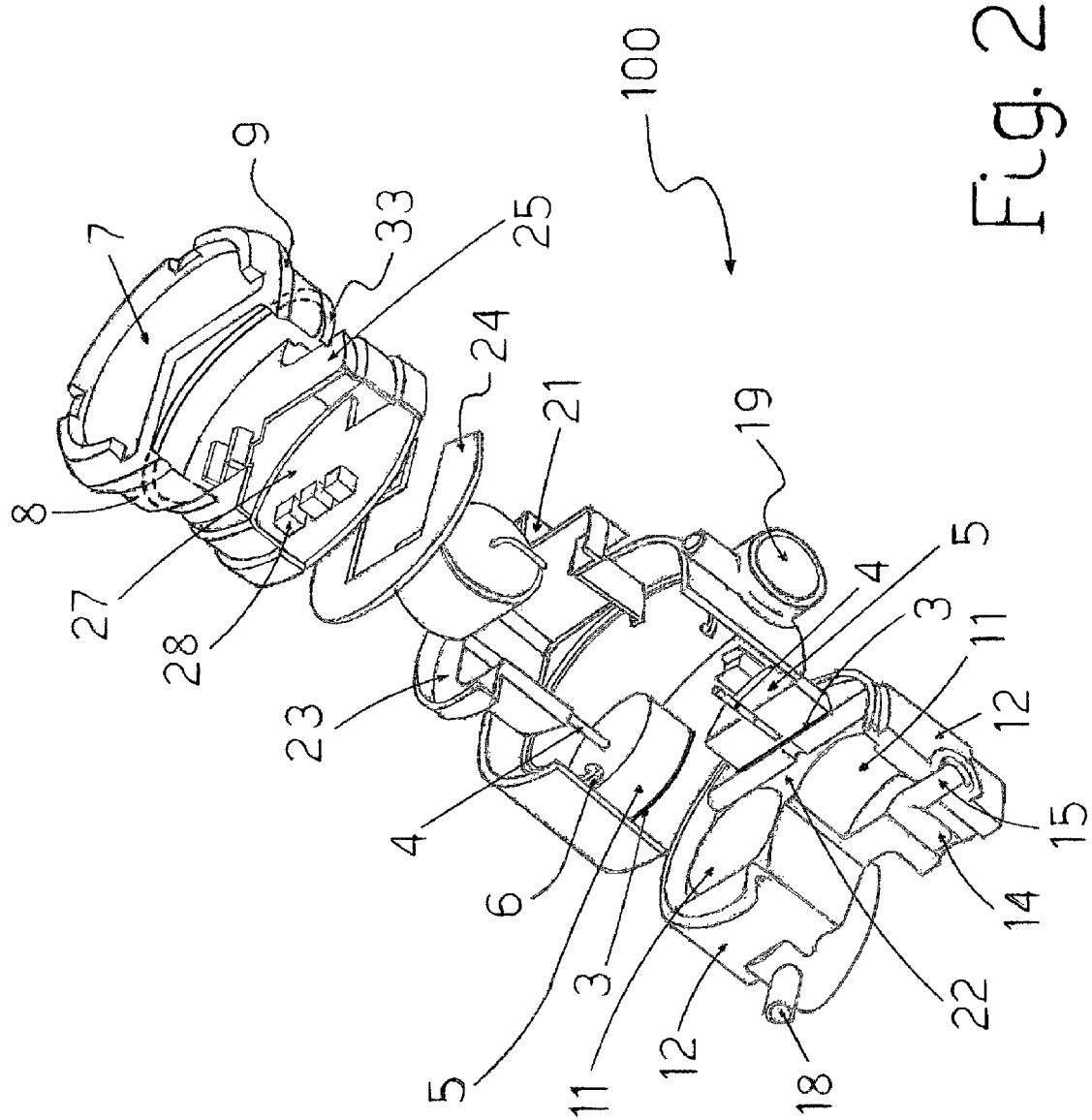
FIG. 2 is an exploded perspective view of the transmitter in FIG. 1.

In particular, as illustrated in FIGS. 1 and 2, the interface body 10 has a structure shaped so that it has at least one internal housing 11 for receiving a separation membrane 3; according to widely known embodiments, which are consequently not described in detail, the separation membrane 3 is operatively connected to the sensor 2 by means of a specific hydraulic circuit 4, and is connected to a separator body 5 also positioned in the internal housing 11, i.e. by welding to the superior edge thereof.

The integral structure of the interface body 10 has also at least an end flange 12 suitable to be operatively coupled, at an external surface 13 thereof, to a fluid container which, as will be apparent from the description below, can be the process fluid of which a physical variable is required to be sensed, or a different fluid. The external surface 13, which in practice represents and forms the physical interface of the transmitter with the process, is defined at a certain distance from the internal housing 11 and is preferably placed in communication therewith by means of a connection channel 14, preferably extending substantially rectilinearly along the direction of longitudinal extension (in practice along the axis 101) of the transmitter 100.

According to a particularly preferred embodiment of the transmitter 100, and as better illustrated in FIG. 2, where a part of some of the components of the transmitter has been partially removed for greater clarity of the illustration, the interface body 10 has an integral structure shaped so as to have two internal housings 11 each for receiving a corresponding separation membrane 3 and two end flanges 12 each having an external surface 13 suitable to be operatively coupled with a corresponding fluid container; both end surfaces 13 are positioned at a distance from the respective internal housings 11 and are placed in communication therewith by means of a corresponding connection channel 14.

Figure 3:
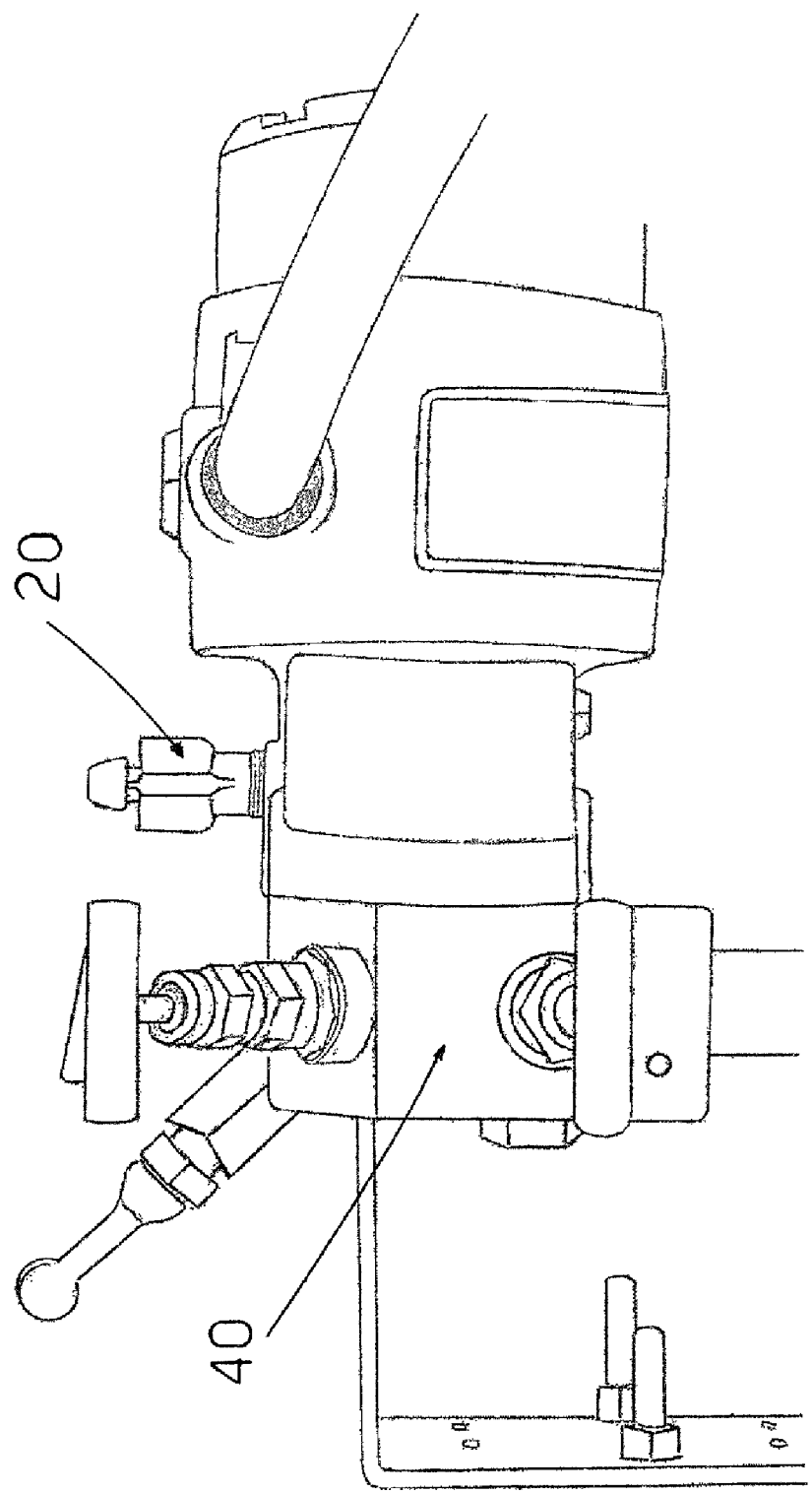
FIGS. 3 and 4 are perspective views illustrating the transmitter according to the invention in two possible applicative configurations.
Figure 4:
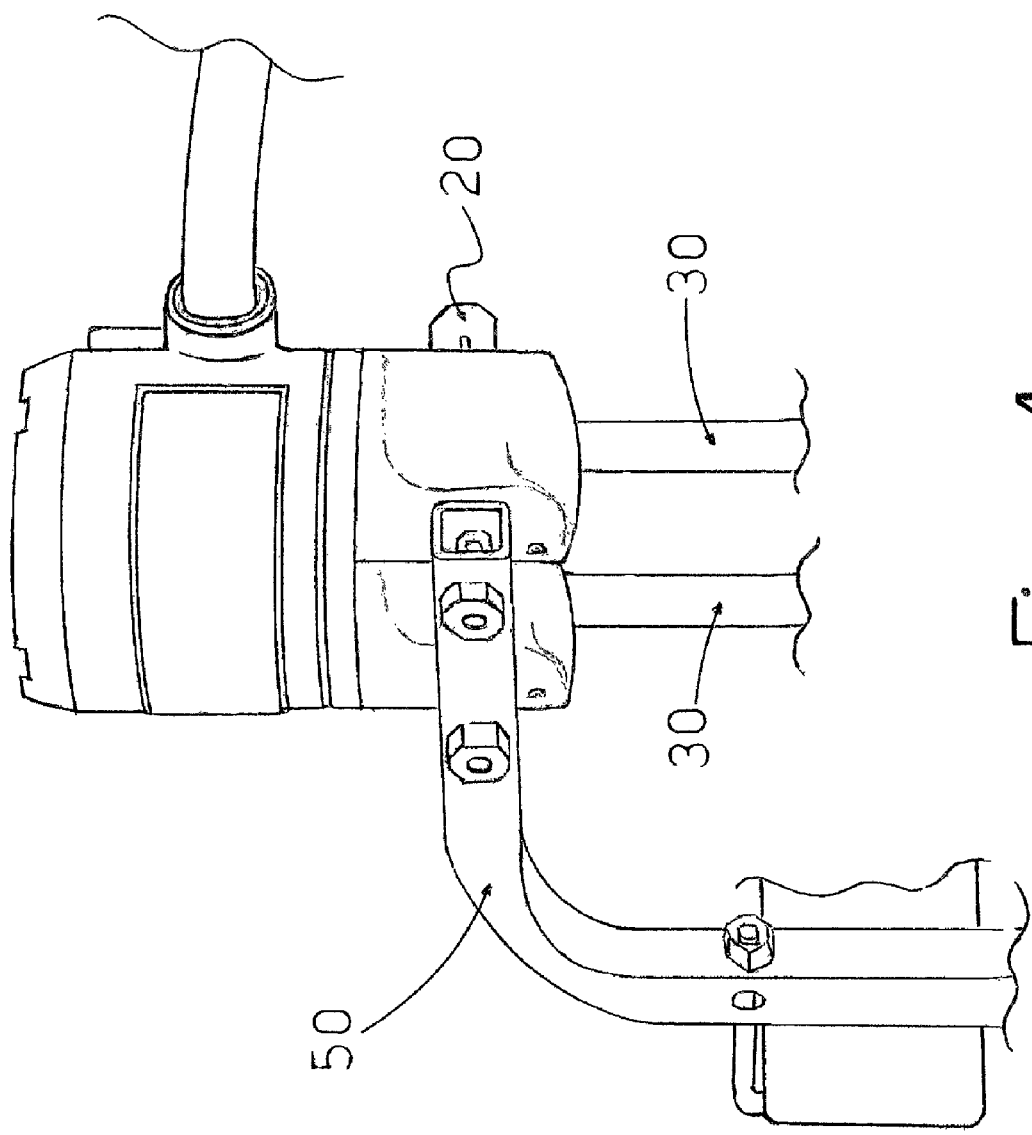

Preferably, the interface body 10 is shaped so that the two flanges 12 also each have a duct 15 which is positioned transverse to the corresponding communication channel 14 and places the latter in communication with the outside of the interface body; preferably, the ducts 15 are at least partially threaded so as to connect with specific bleed valves, indicated for example in FIGS. 3 and 4 by the reference numeral 20.

Moreover, each end flange 12 comprises at least one fixing hole 16 substantially aligned and in communication with the respective connection channel 14 and the inlet of which is defined on the corresponding external surface 13; the fixing holes 16 are suitable for coupling with corresponding fluid containers. In particular, each hole can be connected with a manifold of the process fluid of which a variable is required to be sensed, indicated in FIG. 4 by reference numeral 30, thereby providing a direct interface between body 10 and process. Alternatively, as represented schematically in FIG. 1, the holes 16 can each be coupled to a capillary 31 connected to a remote separator 32, and inside which a suitable fluid is contained, i.e. an incompressible fluid, such as a silicone oil of the same type contained in the hydraulic circuit 4. In this case, it is the remote separator 32 that is directly interfaced with the process fluid of which a variable is required to be sensed, and therefore an indirect operating interface is established between the body 10 and the process fluid.

The interface body 10 is also shaped so that each end flange comprises at least one blind hole 17 suitable to allow coupling with a further component, such as shut-off valves of the process fluid, illustrated in FIG. 3 by the reference numeral 40, or a supporting and fixing bracket of the transmitter, indicated in FIG. 4 by the reference numeral 50. In particular, in the embodiment in FIG. 1, each flange 12 comprises two blind holes 17, the inlet of which is defined on the external interface surface 13, with the two holes 17 positioned on opposite sides to each other with respect to the corresponding communication channel 14 and with axes parallel to each other and to the communication channel 14. Moreover, in addition to or instead of the two blind holes 17, each end flange 12 can comprise a blind hole 18, the inlet of which, as illustrated schematically in FIG. 3, is on the lateral surface of the flange and which is positioned with axis transverse with respect to the corresponding communication channel 14 or with respect to the axis of extension 101 of the transmitter. As illustrated in FIG. 4, the two holes 18, each positioned on the corresponding flange, can be utilized for coupling with the supporting bracket 50.

Preferably, the transmitter 100 comprises a first shaped container 21, which is housed inside the main body 10 and rests on a bearing surface 22 thereof; in particular, the first container 21 (represented in FIG. 2 partially removed for illustrative clarity), due to its shaping, surrounds the sensor 2 and defines thereabout a suitable supporting surface 23; advantageously, a first board 24 comprising a first electronic circuit, coupled operatingly to the sensor 2, is positioned on said supporting surface 23. This first circuit in practice forms the primary electronics of the transmitter, the main purpose of which is to condition the electrical signal arriving from the sensor 2 transforming it, for example, into a digital signal with time duration.

The transmitter 100 according to the invention also comprises a second cup-shaped container 25, which is positioned upside down and housed at least partially inside the main body 1; in particular, the second container 25 rests on a raised part 6 defined inside the main body 1 and faces the first container 23 so as to delimit an internal space to house at least a second board 27. This second board 27 comprises a second electronic circuit that forms the secondary electronics of the transmitter and is mainly for converting the signal with time duration coming from the primary electronics into an output field signal. Moreover, a terminal block 28 for the power wiring of the signal processing part, for connection with an internal display and, optionally, with an external display, etc., can advantageously be provided on the second board 27. Alternatively, two boards, on which the secondary electronic circuits and the terminal block can be appropriately distributed, can be housed inside the second container 25.

Suitable wiring, which is made to pass through one of the two holes 19 provided on the main body 1, operatively connect the transmitter with the outside.

Finally, the transmitter comprises a cover 7 screwed to the main body 1 as illustrated in FIGS. 1 and 2; the cover has a threaded lateral wall 8 which couples with the lateral wall of the main body 1, and a raised part 9 extending transversely toward the outside from the lateral wall 8 and resting along a corresponding edge of the main body 1. The height of the lateral walls 8 can be suitably varied in the event of it being necessary to fit other components, such as a display. A seal 33 positioned between the cover 7 and the body 1 prevents dirt and fluids from penetrating the transmitter.

It has in practice been seen how the transmitter according to the invention allows both the task and the pre-established objects to be fully achieved, providing a series of advantages with respect to prior art. In fact, the transmitter 100 has an extremely simple structure with respect to known transmitters, both as a whole and in at least some of its structural elements, and has improved functional performances.

In particular, the presence of the interface body 10 with specifically shaped integral structure, makes it possible to eliminate a mechanical coupling area which is instead customary in known solutions and, as has been seen, is the source of possible imprecisions and technical drawbacks; this makes it possible to avoid resorting to seals, screws and bolts, and relative clamping operations which, as mentioned, form a weak and critical point for the entire transmitter. In this way it is possible to reduce the overall number of components required, decrease assembly operations, increase overall reliability and substantially improve mechanical performance as, among other things, an increase in ultimate strength with regard to the internal pressure is obtained. Moreover, due to the special shaping of the interface body 10, and to the position of the various accesses thereon, the transmitter can be coupled to different components, brackets, valves, etc., and can be assembled without distinction in a horizontal position (FIG. 3) or a vertical position (FIG. 4) without having to resort to specific structural modifications.

These advantages are further highlighted by the connection of the main body 1 to the interface body 10 by welding, which makes it possible to obtain a single, mechanically stable structure, the parts of which are not separable, with elimination of a further coupling area with conventional mechanical means, such as screws and bolts, typical of prior art solutions.

Finally, but certainly not of secondary importance, due to the shape, position and reciprocal coupling of the various internal components, in particular the containers 21 and 25 and relative boards, the transmitter 100 as a whole has an extremely compact structure in which the various components are stacked and made the best use of the space available. Moreover, the most sensitive components, such as the sensor 2 and the electronic circuits provided on the boards, are positioned in a suitably enclosed and protected environment.

The transmitter thus conceived is susceptible to numerous modifications and variants all coming within the scope of the inventive concept. For example, the container 21 (just as the container 25) can have a different shape as long as it is compatible with the functions it requires to perform, and can be produced in one piece or in two separate pieces, both made of metal or plastic or one of metal and the other of plastic. The position of at least some of the holes/channels provided on the interface body 10 could be modified; for example, the hole 18 and the duct 15 could extend parallel to each other, etc.

Moreover, all the parts can be replaced with other technically equivalent elements; in practice, the type of materials within the scope of the foreseen applications described above, and the dimensions, can be any according to needs and to the state of the art.

The invention claimed is:

1. Transmitter for sensing a physical variable relative to a process fluid of an industrial plant, characterized in that it comprises at least a hollow main body for housing a sensor, and a body for direct or indirect interface with a process fluid of which a physical variable requires to be sensed, said interface body being connected to the main body and having an integral structure shaped so that it has at least one internal housing for receiving a separator body and at least one end flange suitable to be operatively coupled, at an external surface thereof, to a fluid container, said external surface being positioned at a distance from and in communication with said internal housing by means of a connection channel;

wherein said connection channel extends rectilinearly along the longitudinal axis of the transmitter.

2. Transmitter according to claim 1, characterized in that said interface body comprises two internal housings each for receiving a separation membrane and two end flanges each having an external surface suitable to be operatively coupled with a corresponding fluid container, each of said end surfaces being positioned at a distance from and in communication with a respective internal housing by means of a corresponding connection channel.

3. Transmitter according to claim 1, characterized in that said main body and said interface body are welded to each other.

4. Transmitter according to claim 1, characterized in that said interface body has a pair of ducts each of which is positioned transverse to and places in communication a corresponding connection channel with the outside of said interface body.

5. Transmitter according to claim 1, characterized in that each of said end flanges comprises at least one fixing hole of a capillary connected to a remote separator interfaced with the process fluid of which a variable is required to be sensed, the inlet of said fixing hole being defined on the corresponding external surface of the end flange and being substantially aligned and in communication with the respective connection channel.

6. Transmitter according to claim 1, characterized in that each of said end flanges comprises at least one fixing hole of a manifold of the process fluid of which a variable is required to be sensed, the inlet of said hole being defined on the corresponding external surface of the end flange and being substantially aligned and in communication with the respective connection channel.

7. Transmitter according to claim 1, characterized in that each of said end flanges comprises at least one blind hole suitable to allow coupling with a further component.

8. Transmitter according to claim 7, characterized in that each of said end flanges comprises two blind holes the inlet of which is defined on said external surface, said two holes being positioned on opposite sides from each other with respect to the corresponding communication channel and with axes substantially parallel to each other and to said channel.

9. Transmitter according to claim 7, characterized in that each of said end flanges comprises a blind hole having an inlet on a lateral surface of the flange and positioned with axis transverse with respect to the corresponding communication channel.

10. Transmitter according to claim 1, characterized in that it comprises a first shaped container housed inside said main body and resting on a bearing surface defined on the interface body, said first container surrounding said sensor and defining thereabout a supporting surface on which a first board comprising a first electronic circuit coupled operatingly to the sensor is positioned.

11. Transmitter according to claim 10, characterized in that it comprises a second cup-shaped container positioned upside down and resting on an edge defined inside the main body, said second container delimiting an internal space for housing at least a second board comprising a second electronic circuit and/or a connection terminal block.

12. Transmitter according to claim 2, characterized in that said interface body has a pair of ducts each of which is positioned transverse to and places in communication a corresponding connection channel with the outside of said interface body.

13. Transmitter according to claim 3, characterized in that said interface body has a pair of ducts each of which is positioned transverse to and places in communication a corresponding connection channel with the outside of said interface body.

14. Transmitter according to claim 2, characterized in that each of said end flanges comprises at least one fixing hole of a capillary connected to a remote separator interfaced with the process fluid of which a variable is required to be sensed, the inlet of said fixing hole being defined on the corresponding external surface of the end flange and being substantially aligned and in communication with the respective connection channel.

15. Transmitter according to claim 3, characterized in that each of said end flanges comprises at least one fixing hole of a capillary connected to a remote separator interfaced with the process fluid of which a variable is required to be sensed, the inlet of said fixing hole being defined on the corresponding external surface of the end flange and being substantially aligned and in communication with the respective connection channel.

16. Transmitter according to claim 4, characterized in that each of said end flanges comprises at least one fixing hole of a capillary connected to a remote separator interfaced with the process fluid of which a variable is required to be sensed, the inlet of said fixing hole being defined on the corresponding external surface of the end flange and being substantially aligned and in communication with the respective connection channel.

17. Transmitter according to claim 2, characterized in that each of said end flanges comprises at least one fixing hole of a manifold of the process fluid of which a variable is required to be sensed, the inlet of said hole being defined on the corresponding external surface of the end flange and being substantially aligned and in communication with the respective connection channel.

18. Transmitter according to claim 3, characterized in that each of said end flanges comprises at least one fixing hole of a manifold of the process fluid of which a variable is required to be sensed, the inlet of said hole being defined on the corresponding external surface of the end flange and being substantially aligned and in communication with the respective connection channel.

19. Transmitter according to claim 4, characterized in that each of said end flanges comprises at least one fixing hole of a manifold of the process fluid of which a variable is required to be sensed, the inlet of said hole being defined on the corresponding external surface of the end flange and being substantially aligned and in communication with the respective connection channel.

20. Transmitter according to claim 5, characterized in that each of said end flanges comprises at least one fixing hole of a manifold of the process fluid of which a variable is required to be sensed, the inlet of said hole being defined on the corresponding external surface of the end flange and being substantially aligned and in communication with the respective connection channel.

* * * * *